(12) United States Patent
Motoki

(10) Patent No.: US 9,584,016 B2
(45) Date of Patent: Feb. 28, 2017

(54) USB POWER SUPPLY APPARATUS

(71) Applicant: ROHM CO., LTD., Ukyo-Ku, Kyoto (JP)

(72) Inventor: Kenichi Motoki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 0 days.

(21) Appl. No.: 14/919,062

(22) Filed: Oct. 21, 2015

(65) Prior Publication Data
US 2016/0118880 A1  Apr. 28, 2016

(30) Foreign Application Priority Data
Oct. 24, 2014 (JP) .................................. 2014-217687

(51) Int. Cl.
*H02M 3/156* (2006.01)
*H02M 3/335* (2006.01)

(52) U.S. Cl.
CPC ....... *H02M 3/156* (2013.01); *H02M 3/33523* (2013.01)

(58) Field of Classification Search
CPC .......................... H02M 3/156; H02M 3/33523
See application file for complete search history.

(56) References Cited

U.S. PATENT DOCUMENTS

| | | | | |
|---|---|---|---|---|
| 2010/0202161 A1* | 8/2010 | Sims | ........................ | H02M 7/02 363/20 |
| 2011/0068626 A1* | 3/2011 | Terlizzi | ..................... | H02J 1/08 307/32 |
| 2015/0229119 A1* | 8/2015 | Tao | ........................... | H02H 3/16 361/91.1 |
| 2015/0380924 A1* | 12/2015 | Ohwaki | ............... | H02H 3/0935 361/93.7 |
| 2016/0091940 A1* | 3/2016 | Oh | ........................... | G06F 1/26 713/300 |

FOREIGN PATENT DOCUMENTS

| | | | |
|---|---|---|---|
| JP | 2006060977 A | | 3/2006 |
| JP | 2006304500 A | | 11/2006 |
| JP | 2013198262 A | | 9/2013 |

\* cited by examiner

*Primary Examiner* — Jue Zhang
*Assistant Examiner* — Lakaisha Jackson
(74) *Attorney, Agent, or Firm* — Cantor Colburn LLP (57) ABSTRACT

A USB power supply apparatus conforms to the USB (Universal Serial Bus) specification, and supplies electric power to a USB power receiving apparatus. A bus line connects the output of a power supply circuit and the USB power receiving apparatus. A switch is provided on a path of the bus line. A selector selects one from among the output voltage $V_{OUT}$ of the power supply circuit and the bus voltage $V_{BUS}$ at a position that is closer to the USB power receiving apparatus side than the switch. A feedback circuit feedback controls the power supply circuit such that the voltage $V_S$ selected by the selector approaches a setting voltage $V_{SET}$. A controller controls the switch and the selector based on the state of the USB power supply apparatus.

12 Claims, 8 Drawing Sheets

USB POWER SUPPLY APPARATUS

This application is based upon and claims the benefit of priority under 35 U.S.C. §119 from the prior Japanese Patent Application No. 2014-217687, filed Oct. 24, 2014, the entire contents of which are incorporated herein by reference.

BACKGROUND OF THE INVENTION

Field of the Invention

The present invention relates to a USB power supply apparatus.

Description of the Related Art

Battery-driven devices such as cellular phone terminals, tablet terminals, laptop computers, and portable audio players each include a chargeable secondary battery and a charger circuit that charges the secondary battery as built-in components. Known examples of such charger circuits include an arrangement that charges a secondary battery using a DC voltage (bus voltage $V_{BUS}$) supplied from an external circuit via a USB (Universal Serial Bus) cable.

At present, as a charger circuit mounted on a mobile device, charger circuits that conform to a specification which is referred to as the "USB Battery Charging Specification" (which will be referred to as the "BC specification" hereafter) have become mainstream. There are several kinds of USB hosts or USB chargers (which will collectively be referred to as a "USB power supply apparatus" hereafter). As the kinds of USB power supply apparatuses that conform to revision 1.2 of the BC specification, SDP (Standard Downstream Port), DCP (Dedicated Charging Port), and CDP (Charging Downstream Port) have been defined. The current (current capacity) that can be provided by a USB power supply apparatus is determined according to the kind of USB power supply apparatus. Specifically, DCP and CDP are defined to provide a current capacity of 1500 mA. Also, SDP is defined to provide a current capacity of 100 mA, 500 mA, or 900 mA, according to the USB version.

As a next-generation secondary battery charging method using USB, a specification which is referred to as the "USB Power Delivery Specification" (which will be referred to as the "PD specification" hereafter) has been developed. The PD specification allows the available power to be dramatically increased up to a maximum of 100 W, as compared with the BC standard, which provides a power capacity of 7.5 W. Specifically, the PD specification allows a USB bus voltage that is higher than 5 V (specifically, 12 V or 20 V). Furthermore, the PD specification allows a charging current that is greater than that defined by the BC specification (specifically, the PD specification allows a charging current of 2 A, 3 A or 5 A).

Figure 1:
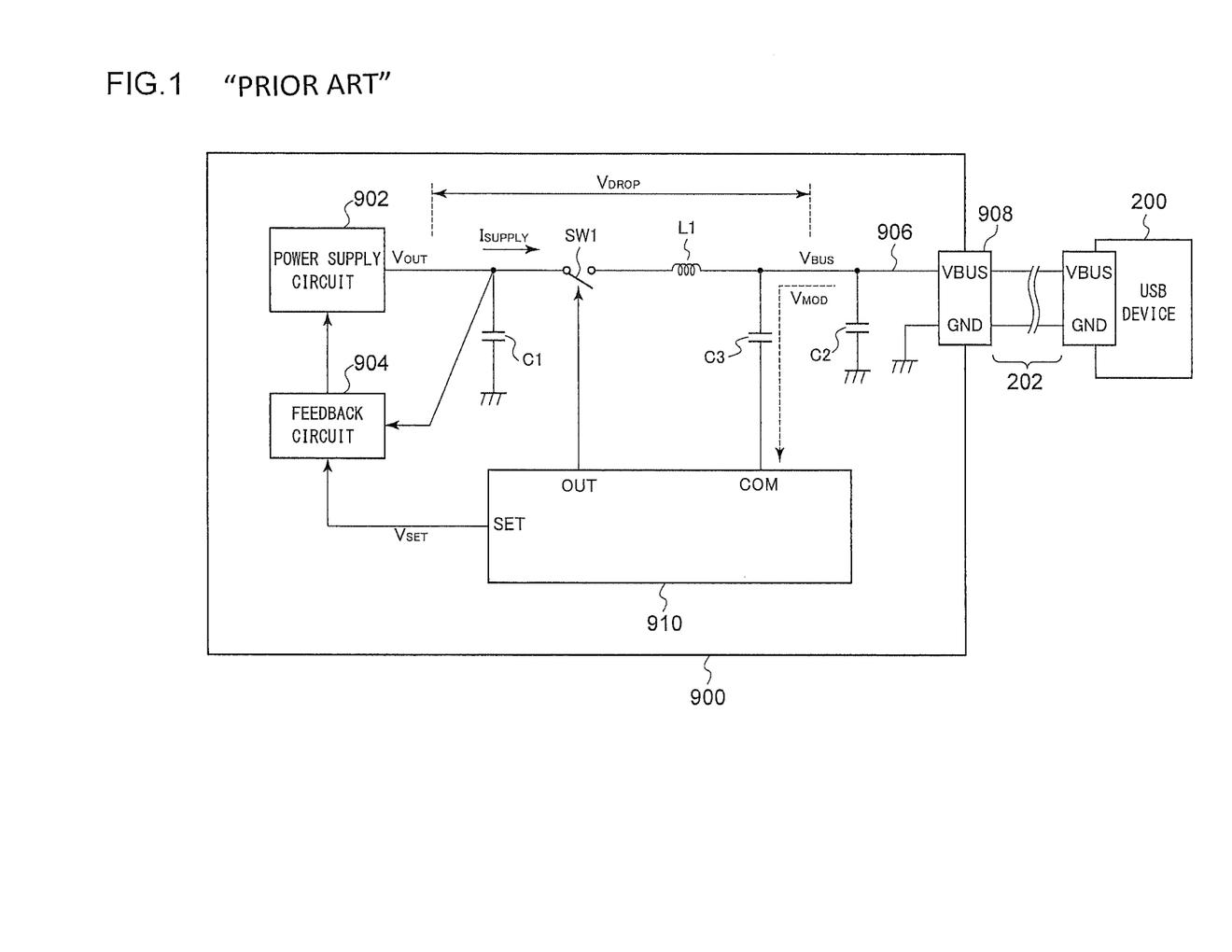
FIG. 1 is a block diagram showing a USB host that conforms to the USB-PD specification investigated by the present inventor.

FIG. 1 is a block diagram showing a USB host 900 that conforms to the USB-PD specification investigated by the present inventors. A receptacle (USB port) 908 configured as a cable plug opening is connected via a USB cable 202 to a USB device (slave device, which will be referred to as a "USB power receiving apparatus" hereafter) 200 that functions as a power supply destination. In the drawing, only a VBUS line and a GND line are shown.

A power supply circuit 902 generates a DC voltage $V_{OUT}$ to be supplied to the USB power receiving apparatus 200. A feedback circuit 904 feedback controls the power supply circuit 902 such that an output voltage $V_{OUT}$ of the power supply circuit 902 approaches a setting voltage $V_{SET}$. With the USB-PD specification, the setting voltage $V_{SET}$ is selected from among 5 V, 12 V, and 20 V.

The output of the power supply circuit 902 and the receptacle 908 are connected to each other via a bus line 906. A switch SW1 and an inductor L1 are provided to the bus line 906 such that they are arranged in series. Furthermore, a smoothing output capacitor C1 is connected to the output of the power supply circuit 902. Moreover, an output capacitor C2 is connected in the vicinity of the receptacle 908.

A communication (COM) terminal of a controller 910 is coupled with the bus line 906 via a capacitor C3 for DC blocking. With the USB-PD specification, a modulation signal $V_{MOD}$ is superimposed on the bus voltage $V_{BUS}$, which allows the USB host 900 and the USB power receiving apparatus 200 to communicate with each other via the bus line 906. The modulation signal $V_{MOD}$ thus superimposed is input to the COM terminal via the capacitor C3. The controller 910 determines the setting voltage $V_{SET}$ of the bus voltage $V_{BUS}$ based on the negotiation with the USB power receiving apparatus 200. Furthermore, the controller 910 notifies the USB power receiving apparatus 200 of the allowed value of the supply current (charging current) $I_{SUPPLY}$.

The USB-PD specification provides a larger allowed supply current $I_{SUPPLY}$ than that provided by the conventional BC specification. Thus, the USB-PD specification requires strict overcurrent protection and strict overvoltage protection. Specifically, in order to provide such circuit protection, the switch SW1 is provided. The controller 910 has an overcurrent protection function of turning off the switch SW1 when the current value of the supply current $I_{SUPPLY}$ exceeds an overcurrent threshold value. Also, the controller 910 has an overvoltage protection function of turning off the switch SW1 when the output voltage $V_{OUT}$ of the power supply circuit 902 or otherwise the bus voltage $V_{BUS}$ exceeds an overvoltage threshold value.

As a result of investigating the USB host 900 shown in FIG. 1, the present inventor has come to recognize the following problem. That is to say, as the switch SW1, a power MOSFET (Metal Oxide Semiconductor Field Effect Transistor) is employed. However, a MOSFET having an on resistance of several mΩ is costly. Accordingly, in practice, in many cases, a MOSFET having an on resistance that exceeds several tens of mΩ is employed. In this case, a power supply path between the power supply circuit 902 and the receptacle 908 has an impedance on the order of 100 mΩ, which is estimated based on the inductor L1 and the impedance of the bus line 106 itself in addition to the on resistance of the MOSFET. Thus, the voltage drop $V_{DROP}$ is not negligible. Giving consideration to the voltage drop $V_{DROP}$, the bus voltage VBUT is represented by the following Expression (1).

$$V_{BUS} = V_{OUT} - V_{DROP} \qquad (1)$$

For example, when a supply current $I_{SUPPLY}$ of 5 A flows through a resistor of 100 mΩ, the voltage drop becomes 500 mA, which is a large value. That is to say, in a case in which the power supply circuit 902 generates a voltage $V_{OUT}$ of 5 V, the bus voltage $V_{BUS}$ output from the receptacle 908 becomes lower, and specifically, becomes 4.5 V. With the USB-PD specification, in a case in which the setting voltage $V_{SET}$ is set to 5 V, the lower limit value of the bus voltage $V_{BUS}$ is defined to be 4.75 V. Accordingly, as the supply current $I_{SUPPLY}$ becomes larger, it becomes difficult for such an arrangement to satisfy the specification. The same problem can occur in the USB Type-C specification.

SUMMARY OF THE INVENTION

The present invention has been made in view of such a situation. Accordingly, it is an exemplary purpose of an embodiment of the present invention to provide a USB power supply apparatus that is capable of suppressing voltage drop that occurs in the bus voltage output from a receptacle.

An embodiment of the present invention relates to a USB power supply apparatus that conforms to the USB (Universal Serial Bus) specification, and that supplies electric power to a USB power receiving apparatus. The USB power supply apparatus comprises: a power supply circuit; a bus line that connects an output of the power supply circuit and the USB power receiving apparatus; a switch provided on a path of the bus line; a selector that selects one from among an output voltage of the power supply circuit and a bus voltage at a position that is closer to the USB power receiving apparatus side than the switch; a feedback circuit that performs a feedback control operation for the power supply circuit such that the voltage thus selected by the selector approaches a setting voltage; and a controller that controls the switch and the selector based on a state of the USB power supply apparatus.

With such an embodiment, the feedback point set for the power supply circuit can be switched according to the state of the USB power supply apparatus. Such an arrangement reduces an amount of voltage drop that occurs in the bus voltage with respect to the setting voltage thereby providing improved line regulation.

Also, the controller may instruct the selector to select the output voltage during a period in which the switch is in the off state.

Such an arrangement is capable of maintaining the output voltage of the power supply circuit at the setting voltage even if the switch is in the off state. Thus, such an arrangement is capable of supplying the bus voltage to the USB power receiving apparatus immediately after the next time the switch is turned on.

Also, the controller may control the selector based on a supply current supplied to the USB power receiving apparatus via the bus line.

Also, when the supply current is larger than a predetermined threshold value, the controller may instruct the selector to select the bus voltage. Also, when the supply current is smaller than the threshold value, the controller may instruct the selector to select the output voltage.

Also, a receptacle into which a USB cable is to be inserted may be provided to an end of a cable. Also, the selector may receive, as its input signals, the output voltage of the power supply circuit and the bus voltage at the end of the cable. Such an arrangement is capable of eliminating the effect of voltage drop that occurs in the internal components included within the cable.

Also, the selector may receive, as its input signals, voltages respectively obtained by dividing the output voltage and the bus voltage by means of resistors.

Also, the power supply circuit may comprise: a transformer comprising a primary winding and a secondary winding; a switching transistor connected to the primary winding of the transformer; a rectifier circuit that rectifies a current that flows through the secondary winding of the transformer; and a power supply controller that switches the switching transistor according to a feedback signal. Also, the feedback circuit may comprise: an error amplifier that is provided to the secondary side of the transformer, and that generates a signal according to a difference between an output voltage of the selector and the setting voltage; and a photocoupler that transmits an output signal of the error amplifier as the feedback signal to the primary side of the transformer.

Also, the controller may comprise a communication unit that communicates with the USB power receiving apparatus. Also, the controller may determine the setting voltage based on negotiation with the USB power receiving apparatus.

Also, the USB power supply apparatus may conform to the USB-PD (Power Delivery) specification. Also, the USB power supply apparatus may further comprise an inductor provided at a position that is closer to the USB power receiving apparatus side than the switch. Also, the selector may receive, as its input signal, the bus voltage at a position that is closer to the USB power receiving apparatus side than the inductor.

Also, the USB power supply apparatus may conform to the USB-PD (Universal Serial Bus-Power Delivery) specification or otherwise the USB Type-C specification.

Another embodiment of the present invention relates to an electronic device. The electronic device may comprise any one of the aforementioned USB power supply apparatuses.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Figure 2:
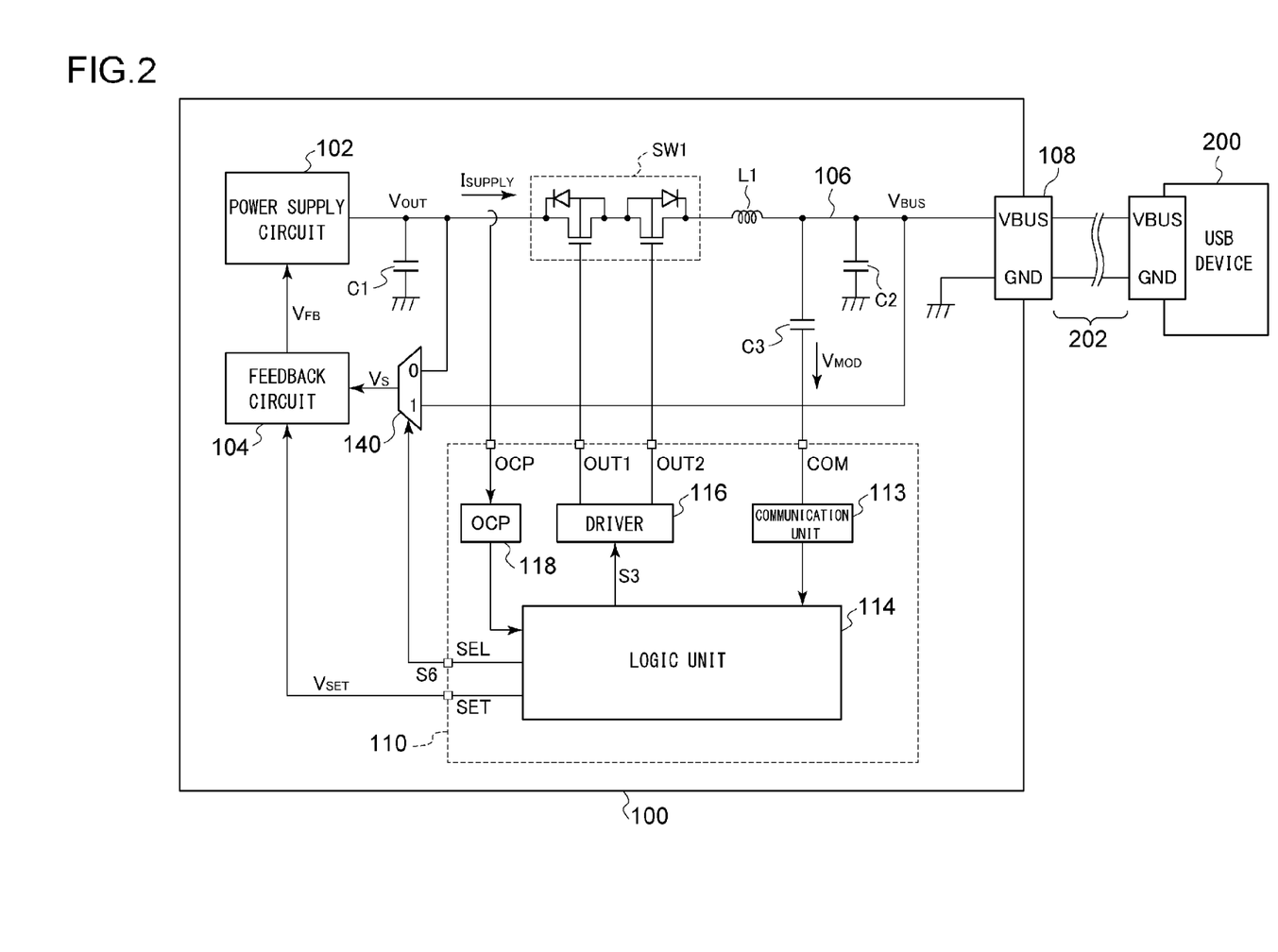
FIG. 2 is a block diagram showing a USB power supply apparatus according to an embodiment.

FIG. 2 is a block diagram showing a USB power supply apparatus 100 according to an embodiment. The USB power supply apparatus 100 conforms to the USB-PD specification. Specifically, the USB power supply apparatus 100 may be configured as a USB host or a USB charger having a host function or otherwise no host function. Alternatively, the USB power supply apparatus 100 may be configured as a USB charger mounted on a dual role terminal of a host device. A USB power receiving apparatus 200 that functions as a power supply destination is connected to a receptacle (which will also be referred to as the "USB port" or "USB plug") via a USB cable 202. Typically, the USB power receiving apparatus 200 is configured as a USB device. Also, the USB power receiving apparatus 200 may be configured as a dual role terminal of a host device or may be configured as a terminal having a host function. In the drawing, only a VBUS line and a GND line are shown.

A power supply circuit 102 generates a DC voltage $V_{OUT}$ to be supplied to the USB power receiving apparatus 200.

A bus line 106 connects the output of the power supply circuit 102 and the receptacle 108. A switch SW1 and an inductor L1 are provided on the bus line 106 path such that they are arranged in series. For example, the switch SW1 includes a pair of N-channel MOSFETs arranged such that they are opposite to each other. A capacitor C2 is connected to the bus line 106 in the vicinity of the receptacle 108, so as to smooth the bus voltage $V_{BUS}$.

A selector 140 selects one from among the output voltage $V_{OUT}$ of the power supply circuit 102 and the bus voltage $V_{BUS}$ at a position that is closer to the USB power receiving apparatus 200 side than the switch SW1. The selector 140 outputs the selected voltage (which will be referred to as the "control target voltage" hereafter) $V_S$ to a feedback circuit 104.

The feedback circuit 104 feedback controls the power supply circuit 102 such that the control target voltage $V_S$ thus selected by the selector 140 approaches the setting voltage $V_{SET}$. A capacitor C1 smooths the output voltage $V_{OUT}$ of the USB power supply apparatus 100.

Specifically, the feedback circuit 104 amplifies the difference between the control target voltage $V_S$ and the setting voltage $V_{SET}$ so as to generate a feedback voltage $V_{FB}$, and supplies the feedback voltage $V_{FB}$ thus generated to the power supply circuit 102. The power supply circuit 102 receives the feedback voltage $V_{FB}$, and adjusts the output voltage $V_{OUT}$ such that the difference between the output voltage $V_{OUT}$ and the setting voltage $V_{SET}$ approaches zero. The configurations of the power supply circuit 102 and the feedback circuit 104 are not restricted in particular. For example, the power supply circuit 102 may be configured as a linear regulator, a step-up or otherwise step-down DC/DC converter, or an AC/DC converter. Also, the power supply circuit 102 may be configured as a combination of these.

The controller 110 integrally controls the overall operation of the USB power supply apparatus 100. The controller 110 has: (i) a function of communicating with the USB power receiving apparatus 200 so as to determine the setting voltage $V_{SET}$; (ii) a function of controlling the power supply circuit 102; (iii) a function of controlling the on/off state of the switch SW1; and (iv) a function of controlling the selector 140.

The COM terminal of the controller 110 is coupled with the bus line 106 via a capacitor C3. A communication unit 113 receives a modulation voltage $V_{MOD}$ superimposed on the bus voltage $V_{BUS}$, demodulates the modulation voltage $V_{MOD}$ and outputs the demodulated signal to a logic unit 114. The logic unit 114 determines, based on negotiation with the USB power receiving apparatus 200, the voltage level (setting voltage $V_{SET}$) of the bus voltage $V_{BUS}$ to be supplied from the USB power supply apparatus 100 to the USB power receiving apparatus 200.

The logic unit 114 of the controller 110 notifies the feedback circuit 104 of the setting voltage $V_{SET}$ thus determined.

The logic unit 114 controls the on/off state of the switch SW1 according to the electrical state of the USB power supply apparatus 100 or a predetermined sequence. A driver 116 controls the switch SW1 according to a control signal S3 generated by the logic unit 114. For example, the driver 116 includes a charge pump circuit. When an instruction is received to turn on the switch SW1, the driver 116 generates a high-level voltage that is higher than $V_{OUT}$, and supplies the high-level voltage thus generated to the gate of the switch SW1.

An OCP (overcurrent protection) circuit 118 detects the supply current $I_{SUPPLY}$, and compares the supply current $I_{SUPPLY}$ thus detected with an overcurrent threshold value $I_{OCP}$ so as to detect an overcurrent state. When such an overcurrent state is detected, the logic unit 114 switches the switch SW1 to the off state. In addition, the controller 110 may include an OVP (overvoltage protection) circuit. When an overvoltage state is detected, the logic unit 114 may switch the switch SW1 to the off state.

The logic unit 114 generates a selection signal S6 based on the state of the USB power supply apparatus 100, which is used to control the selector 140. For example, when the selection signal S6 is set to high level (1), the selector 140 selects the bus voltage $V_{BUS}$. When the selection signal S6 is set to low level (0), the selector 140 selects the output voltage $V_{OUT}$.

The controller 110 instructs the selector 140 to select the bus voltage $V_{BUS}$ during a period in which the switch SW1 is in the on state. On the other hand, during a period in which the switch SW1 is in the off state, the controller 110 instructs the selector 140 to select the output voltage $V_{OUT}$.

Also, the controller 110 may include a discharge circuit that discharges the charge stored in the output capacitors C1 and C2. Also, the logic unit 114 may control the discharge circuit. It should be noted that the present invention does not relate to such functions, and accordingly, description thereof will be omitted.

Figure 3:
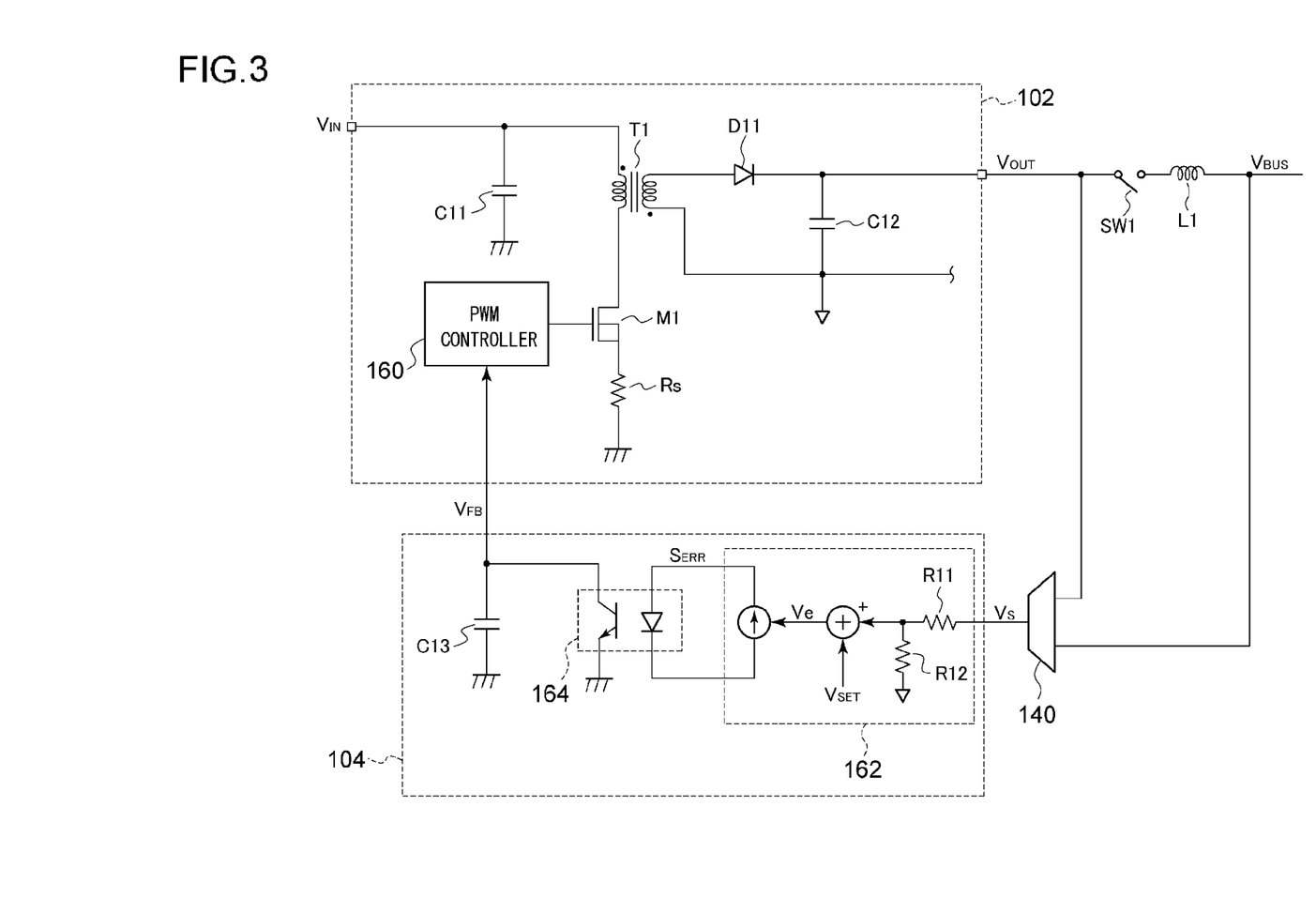
FIG. 3 is a circuit diagram showing an example configuration of a power supply circuit and a feedback circuit.

FIG. 3 is a circuit diagram showing an example configuration of the power supply circuit 102 and the feedback circuit 104. The power supply circuit 102 shown in FIG. 3 may be configured as an insulated flyback converter including a switching transistor M1, a current detection resistor Rs, a PWM controller 160, a transformer T1, a diode D11, and capacitors C11 and C12. It should be noted that the capacitor C12 corresponds to the capacitor C2 shown in FIG. 2. The PWM controller 160 receives the feedback signal $V_{FB}$ from the feedback circuit 104, generates a driving pulse having a duty ratio that corresponds to the feedback signal $V_{FB}$, and outputs the driving pulse thus generated to the gate of the switching transistor M1.

The feedback circuit 104 includes an error amplifier 162, a photocoupler 164, and a capacitor C13. The error amplifier 162 is also referred to as a "shunt regulator". The error amplifier 162 generates an error signal $S_{ERR}$ that corresponds to a difference between the setting voltage $V_{SET}$ and the control target voltage $V_S$ received from the selector 140. The error amplifier 162 may include resistors R11 and R12 arranged to divide the control target voltage $V_S$. The photocoupler 164 allows the error signal $S_{ERR}$ to be transmitted from the secondary side to the primary side, which are insulated from each other, of the transformer T1. The capacitor C13 converts the output current received from the photocoupler 164 into the feedback signal $V_{FB}$ configured as a voltage signal. The feedback signal $V_{FB}$ thus converted is input to the PWM controller 160.

The above is the configuration of the USB power supply apparatus 100. Next, description will be made regarding the operation thereof.

Figure 4:
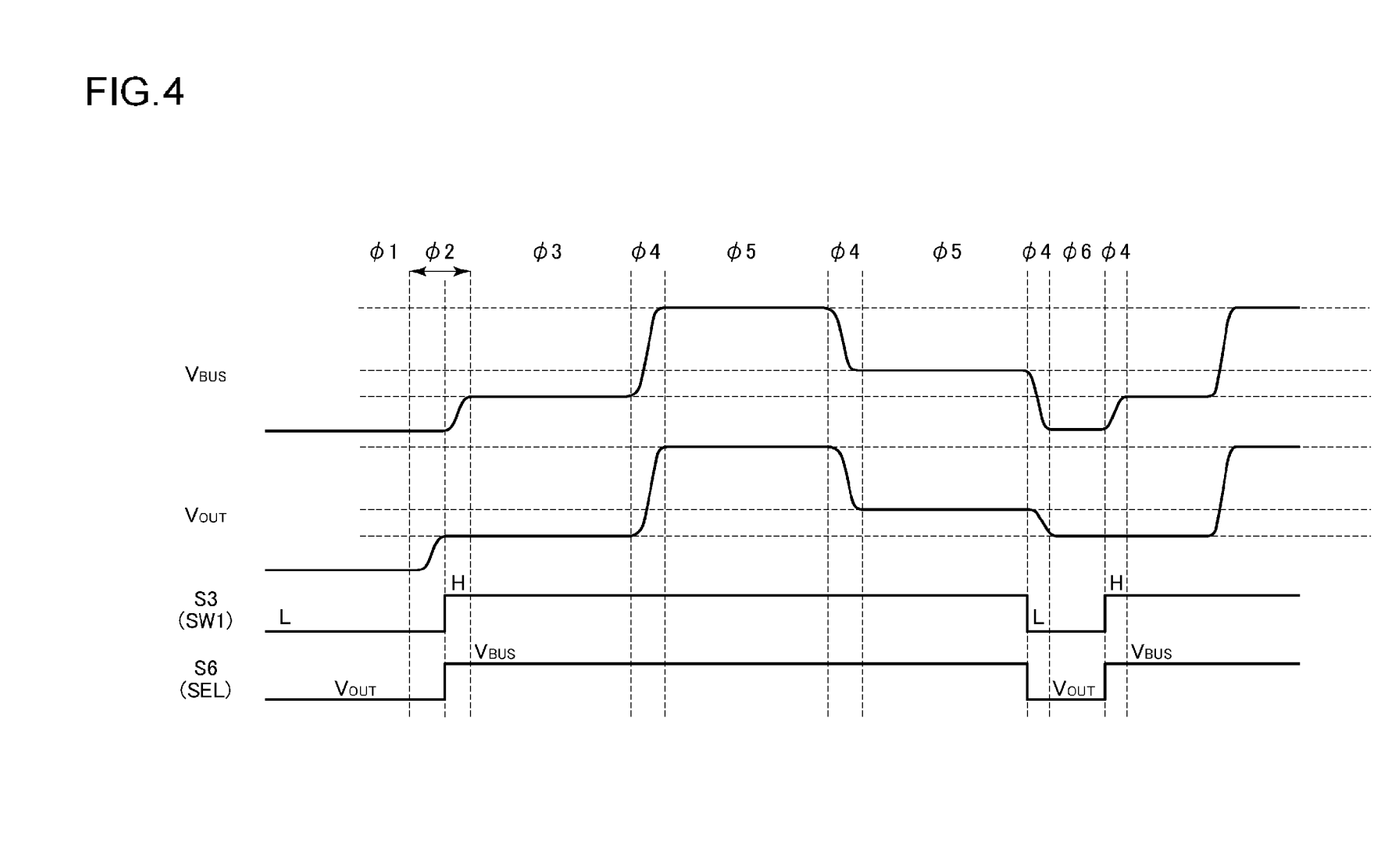
FIG. 4 is an operation waveform diagram showing the operation of the USB power supply apparatus shown in FIG. 2.

FIG. 4 is an operation waveform diagram showing the operation of the USB power supply apparatus 100 shown in FIG. 2. In a state φ1, the power supply is in the off state. In this state, the operation of the USB power supply apparatus 100 is suspended, and the switch SW1 is in the off state.

In a state φ2, the USB power supply apparatus 100 is started up. In the startup state φ2, the controller 110 starts up the power supply circuit 102 in a state in which the switch SW1 is in the off state. In this stage, the selector 140 selects the output voltage $V_{OUT}$ of the power supply circuit 102. In this state, the setting voltage $V_{SET}$ for the power supply circuit 102 is set to a base level (e.g., 5 V). After the output voltage $V_{OUT}$ of the power supply circuit 102 becomes the setting voltage $V_{SET}$ in a stable state, the controller 110 turns on the switch SW1, and instructs the selector 140 to select the bus voltage $V_{BUS}$ side.

A state φ3 represents a negotiation standby state. In the state φ3, the bus voltage $V_{BUS}$ of 5 V is output in a stable state. In this stage, the USB power receiving apparatus 200 and the USB power supply apparatus 100 communicate with each other so as to determine the setting voltage $V_{SET}$.

A state φ4 represents a setting voltage $V_{SET}$ transition state. In this stage, the controller 110 notifies the feedback circuit 104 of the setting voltage $V_{SET}$ determined based on the negotiation. This provides a feedback control operation such that the bus voltage $V_{BUS}$ approaches the setting voltage $V_{SET}$ thus switched. After a certain transition time, the bus voltage $V_{BUS}$ is output in a stable state.

A state φ5 represents a transition voltage output state in which the state transits from the PS_READY state to the Connected Standby state.

A state φ6 represents a 0V output state in which a voltage defined as Vsafe0 is output during a predetermined period of time or more. Also, in the 0V output state φ6 and the transition state φ4 immediately before the 0V output state φ6, the controller 110 may turn off the switch SW1, and may instruct the selector 140 to select the output voltage $V_{OUT}$ of the power supply circuit 102. The above is the operation of the USB power supply apparatus 100.

In a state in which the selector 140 selects the bus voltage $V_{BUS}$, a feedback control operation is performed such that the bus voltage $V_{BUS}$ approaches the setting voltage $V_{SET}$. Thus, in this state, such an arrangement is capable of maintaining the bus voltage $V_{BUS}$ at a constant level even if the voltage difference (voltage drop) $V_{DROP}$, which is a difference between $V_{OUT}$ and $V_{SET}$, fluctuates according to the supply current $I_{SUPPLY}$.

The USB power supply apparatus 100 is configured such that the feedback point set for the power supply circuit 102 can be switched according to the state of the USB power supply apparatus 100. Such an arrangement reduces an amount of voltage drop that occurs in the bus voltage $V_{BUS}$ with respect to the setting voltage $V_{SET}$, thereby providing improved line regulation.

The controller 110 instructs the selector 140 to select the output voltage $V_{OUT}$ during a period in which the switch SW1 is in the off state. Such an arrangement allows the output voltage $V_{OUT}$ of the power supply circuit 102 to be maintained at the setting voltage $V_{SET}$ even in a state in which the switch SW1 is in the off state. Thus such an arrangement is capable of supplying the bus voltage $V_{BUS}$ to the USB power receiving apparatus 200 immediately after the next time the switch SW1 is turned on.

Description has been made regarding the present invention with reference to the embodiment. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

[First Modification]

Description will be made in the embodiment regarding an arrangement in which the selector 140 selects the bus voltage $V_{BUS}$ during a period in which the switch SW1 is in the on state. However, the present invention is not restricted to such an arrangement. Also, the controller 110 may control the selector 140 based on the supply current $I_{SUPPLY}$ during a period in which the switch SW1 is in the on state. For example, when the supply current $I_{SUPPLY}$ is larger than a predetermined threshold value, i.e., when the voltage drop $V_{DROP}$ is large, the controller 110 may instruct the selector 140 to select the bus voltage $V_{BUS}$ so as to stabilize the bus voltage $V_{BUS}$ in the vicinity of the setting voltage $V_{SET}$. Conversely, when the supply current $I_{SUPPLY}$ is smaller than the threshold value, i.e., when the voltage drop $V_{DROP}$ is small, the controller 110 may instruct the selector 140 to select the output voltage $V_{OUT}$.

[Second Modification]

Figure 5:
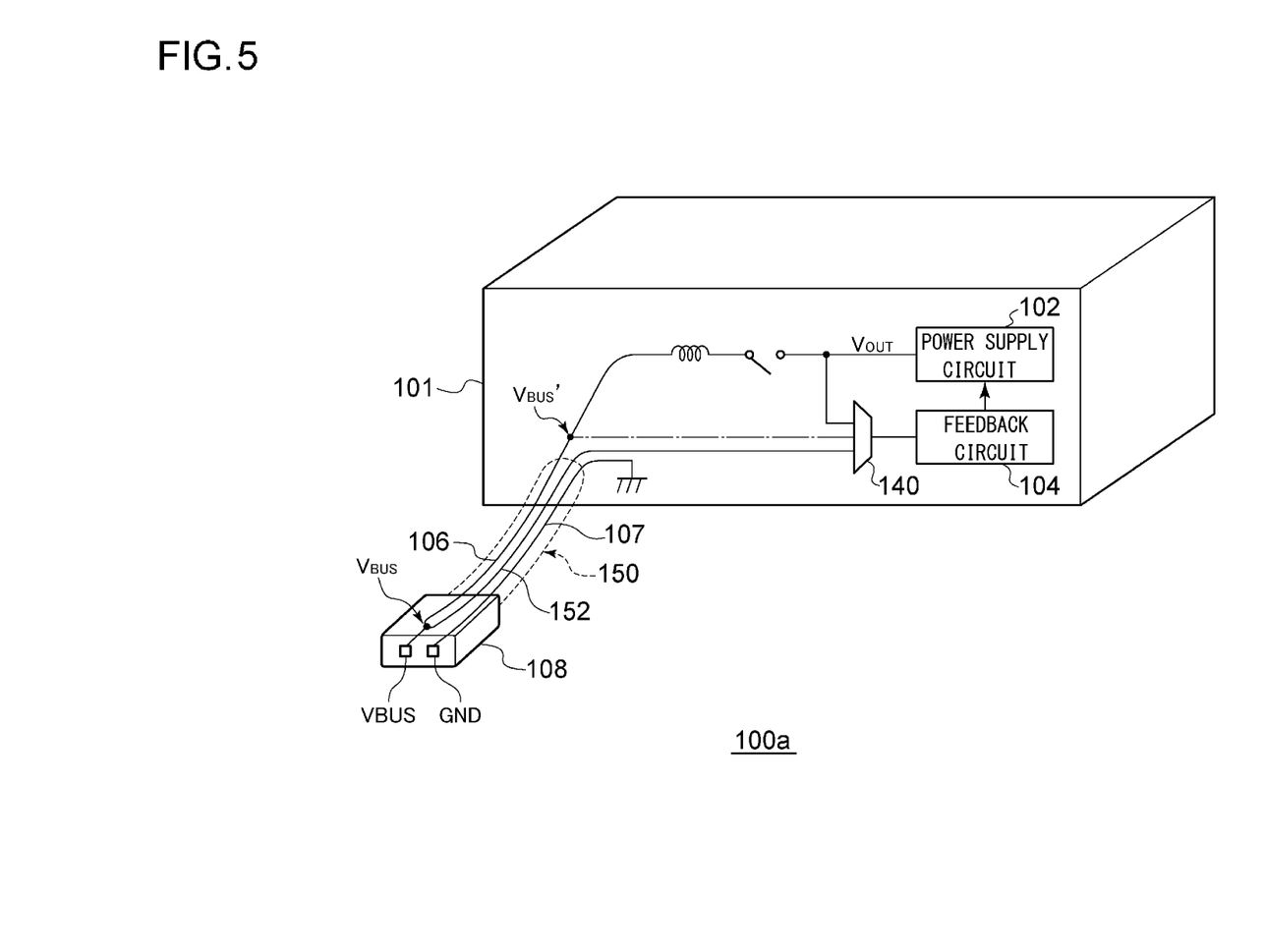
FIG. 5 is a perspective view of a USB power supply apparatus according to a second modification.

FIG. 5 is a perspective view of a USB power supply apparatus 100a according to a second modification. The receptacle 108 is provided to one end of a cable 150 instead of being provided to a casing 101 of the USB power supply apparatus 100a. The cable 150 is provided with a feedback line 152 in addition to the bus line 106 and a ground line 107. One end of the feedback line 152 is connected in the vicinity of a connection node that connects the bus line 106 and the receptacle 108. The feedback line 152 is used to detect the bus voltage $V_{BUS}$ at the end of the cable 150. The selector 140 receives, as its input signals, the output voltage $V_{OUT}$ of the power supply circuit 102 and the bus voltage $V_{BUS}$ at the end of the cable 150.

In a case in which the cable 150 does not include the feedback line 152 as a built-in component, the selector 140 receives, as its input signal, the bus voltage $V_{BUS}'$ at the start point of the cable 150. In this case, the bus voltage $V_{BUS}$ is lower than the setting voltage $V_{SET}$ by a voltage drop that occurs due to the bus line 106 included in the cable 150. In contrast, with such an arrangement in which the feedback line 152 is provided to the cable 150, by feeding back the bus voltage $V_{BUS}$ at the end point of the cable 150, such an arrangement is capable of controlling the bus voltage $V_{BUS}$ such that it approaches the setting voltage $V_{SET}$.

[Third Modification]

Figure 6:
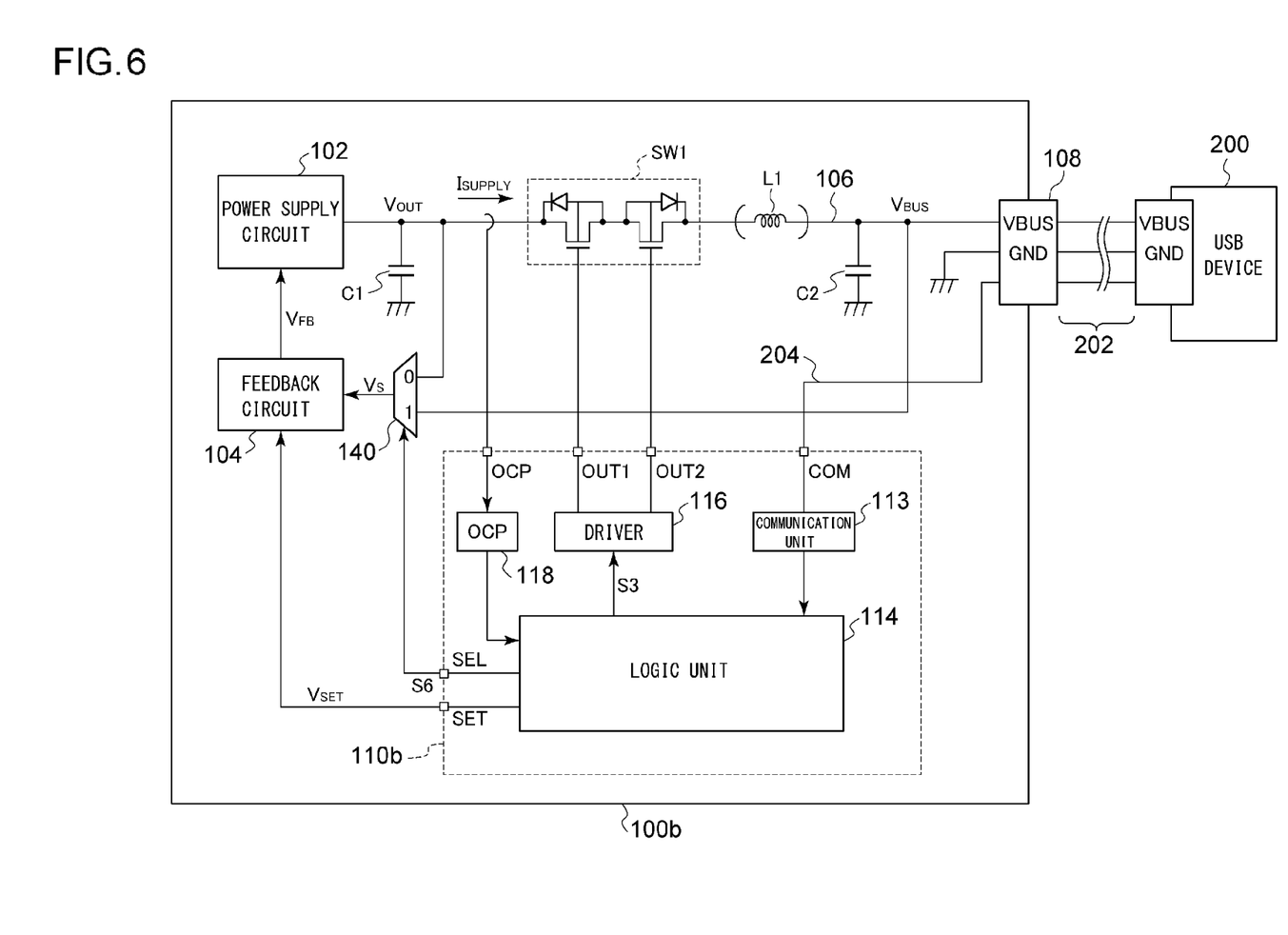
FIG. 6 is a block diagram showing a USB power supply apparatus according to a third modification.

Description has been made in the embodiment regarding the USB power supply apparatus 100 that conforms to the USB-PD specification. Also, the present invention is applicable to an arrangement that conforms to the USB Type-C specification. FIG. 6 is a block diagram showing a USB power supply apparatus 100b according to a third modification. With the USB Type-C specification, a controller 110b and the power receiving apparatus 200 communicate with each other via a dedicated line 204. That is to say, the modulation voltage $V_{MOD}$ is not superimposed on the bus voltage $V_{BUS}$. Thus, such an arrangement does not require the capacitor C3 shown in FIG. 2. Also, the inductor L1 may be omitted. The other configuration is the same as that shown in FIG. 2.

[Fourth Modification]

Description has been made with reference to FIG. 3 regarding the power supply circuit 102 configured as a flyback converter. However, the type of the power supply circuit 102 is not restricted in particular. For example, a forward converter may be employed instead of such a flyback converter. Alternatively, instead of such a converter employing the transformer T1, a boost converter, a back converter, a step-up/step-down converter, or the like, employing an inductor, may be employed.

Also, the configuration of the feedback circuit 104 is not restricted to that shown in FIG. 3. With an application that does not require insulation, the photocoupler 164 may be omitted. In this case, the error amplifier 162 may also be configured as an operational amplifier or a gm amplifier (transconductance amplifier).

[Fifth Modification]

Figure 7:
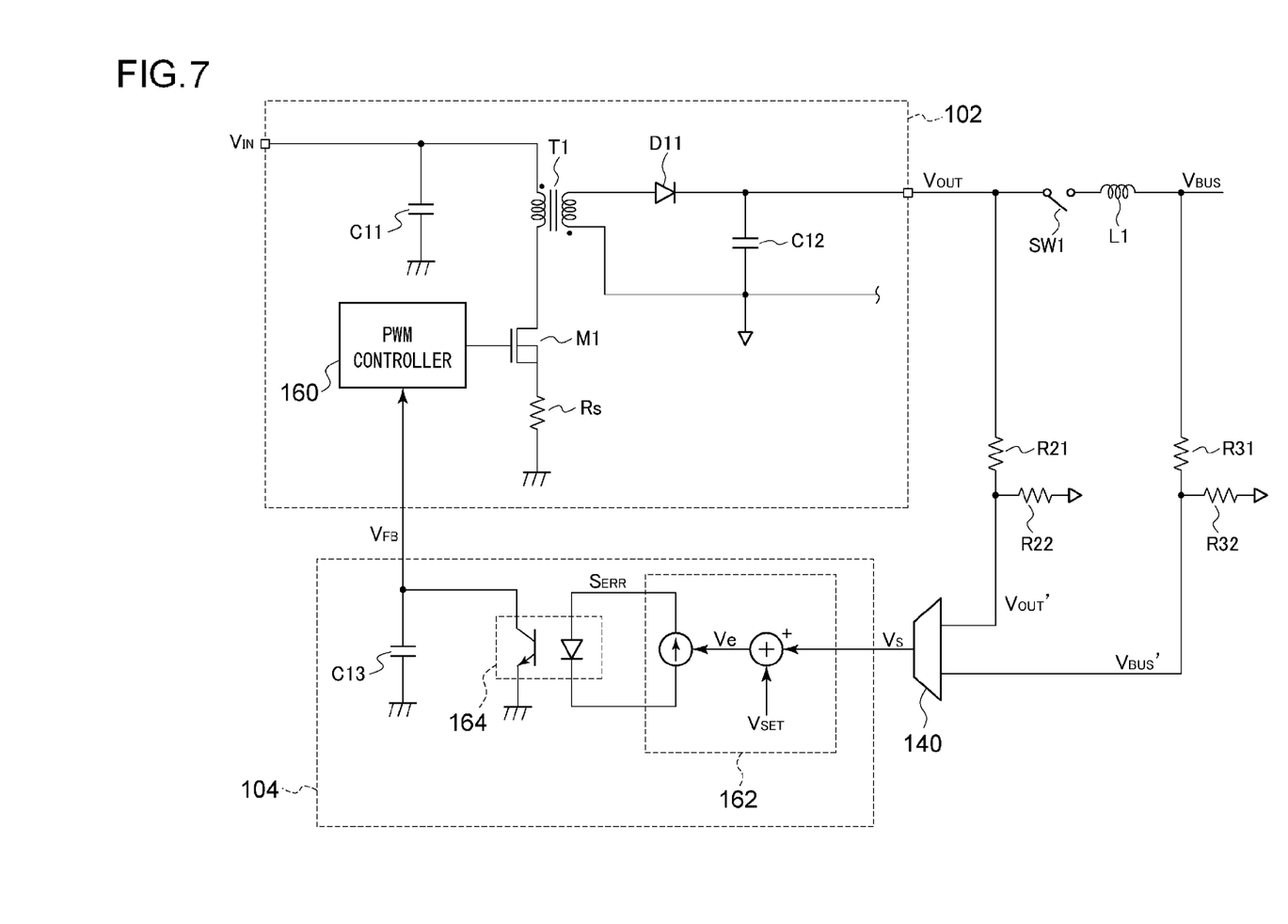
FIG. 7 is a circuit diagram showing a part of a USB power supply apparatus according to a fifth embodiment.

FIG. 7 is a circuit diagram showing a part of a USB power supply apparatus according to a fifth modification. In this modification, at the input side of the selector 140, the output voltage $V_{OUT}$ is independently divided by means of resistors R21 and R22, and the bus voltage $V_{BUS}$ is independently divided by means of resistors R31 and R32. The selector 140 selects one from among the voltages $V_{OUT}'$ and $V_{BUS}'$ thus divided.

[Usage]

Figure 8:
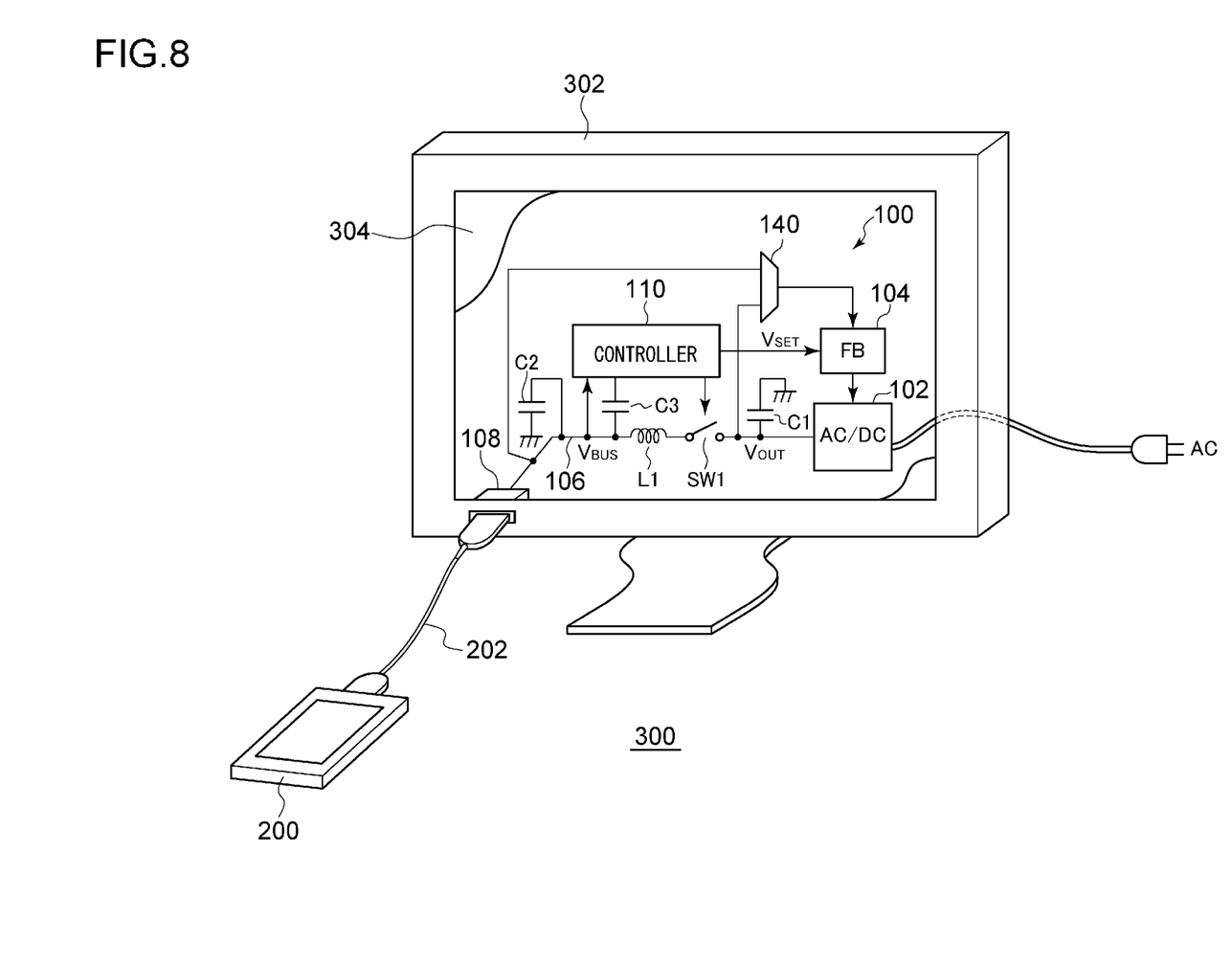
FIG. 8 is a perspective view of an electronic device including a USB power supply apparatus.

Lastly, description will be made regarding the usage of the USB power supply apparatus 100. FIG. 8 is a perspective view of an electronic device 300 including the USB power supply apparatus 100. The electronic device 300 is configured as a TV, a liquid crystal display, a laptop computer, or the like.

The electronic device 300 includes a casing 302, a display panel 304, and the aforementioned USB power supply apparatus 100. The power supply circuit 102 included in the USB power supply apparatus 100 is configured as an AC/DC converter. The power supply circuit 102 converts an AC voltage $V_{AC}$ into a DC voltage $V_{OUT}$. The setting voltage $V_{SET}$ for the DC voltage $V_{OUT}$ is selected by the controller 110. The receptacle 108 is provided on a front face or otherwise a back face of the casing 302, which allows the USB cable 202 to be inserted into the receptacle 108.

It should be noted that the electronic device 300 may be configured as a cellular phone terminal, a tablet terminal, a digital still camera, a digital video camera, or the like.

While the preferred embodiments of the present invention have been described using specific terms, such description is for illustrative purposes only, and it is to be understood that changes and variations may be made without departing from the spirit or scope of the appended claims.

What is claimed is:

1. A USB power supply apparatus that conforms to the USB (Universal Serial Bus) specification, and that supplies electric power to a USB power receiving apparatus, the USB power supply apparatus comprising:
   a power supply circuit;
   a bus line that connects an output of the power supply circuit and the USB power receiving apparatus;
   a switch provided on a path of the bus line;
   a selector that selects one from among an output voltage of the power supply circuit and a bus voltage at a position that is closer to the USB power receiving apparatus side than the switch;
   a feedback circuit that performs a feedback control operation for the power supply circuit such that the voltage thus selected by the selector approaches a setting voltage; and
   a controller that controls the switch and the selector based on a state of the USB power supply apparatus.

2. The USB power supply apparatus according to claim 1, wherein the controller instructs the selector to select the output voltage during a period in which the switch is in the off state.

3. The USB power supply apparatus according to claim 1, wherein the controller controls the selector based on a supply current supplied to the USB power receiving apparatus via the bus line.

4. The USB power supply apparatus according to claim 3, wherein, when the supply current is larger than a predetermined threshold value, the controller instructs the selector to select the bus voltage,
   and wherein, when the supply current is smaller than the threshold value, the controller instructs the selector to select the output voltage.

5. The USB power supply apparatus according to claim 1, wherein a receptacle into which a USB cable is to be inserted is provided to an end of a cable,
   and wherein the selector receives, as its input signals, the output voltage of the power supply circuit and the bus voltage at the end of the cable.

6. The USB power supply apparatus according to claim 1, wherein the selector receives, as its input signals, voltages respectively obtained by dividing the output voltage and the bus voltage by means of resistors.

7. The USB power supply apparatus according to claim 1, wherein the power supply circuit comprises:
   a transformer comprising a primary winding and a secondary winding;
   a switching transistor connected to the primary winding of the transformer;
   a rectifier circuit that rectifies a current that flows through the secondary winding of the transformer; and
   a power supply controller that switches the switching transistor according to a feedback signal,
   and wherein the feedback circuit comprises:
      an error amplifier that is provided to the secondary side of the transformer, and that generates a signal according to a difference between an output voltage of the selector and the setting voltage; and
   a photocoupler that transmits an output signal of the error amplifier as the feedback signal to the primary side of the transformer.

8. The USB power supply apparatus according to claim 1, wherein the controller comprises a communication unit that communicates with the USB power receiving apparatus, and wherein the controller determines the setting voltage based on negotiation with the USB power receiving apparatus.

9. The USB power supply apparatus according to claim 1, that conforms to the USB-PD (Power Delivery) specification, further comprising an inductor provided at a position that is closer to the USB power receiving apparatus side than the switch, wherein the selector receives, as its input signal, the bus voltage at a position that is closer to the USB power receiving apparatus side than the inductor.

10. The USB power supply apparatus according to claim 1, that conforms to the USB-PD (Universal Serial Bus-Power Delivery) specification or otherwise the USB Type-C specification.

11. An electronic device comprising the USB power receiving apparatus according to claim 1.

12. A control method for controlling a USB power supply apparatus that conforms to the USB (Universal Serial Bus) specification, and that supplies an electric power to a USB power receiving apparatus, wherein the USB power supply apparatus comprises:

a power supply circuit;

a bus line that connects an output of the power supply circuit and the USB power receiving apparatus; and a switch provided on a path of the bus line, and wherein the control method comprises:

voltage selecting in which an output voltage of the power supply circuit is selected when the switch is in the off state, or otherwise a bus voltage at a position that is closer to the USB power receiving apparatus side than the switch is selected when the switch is in the on state; and feedback controlling the power supply circuit such that the voltage thus selected approaches a setting voltage.

* * * * *